Jan. 6, 1953     H. G. GENTRY     2,624,705
WATER PURIFIER
Filed July 3, 1950

INVENTOR.
HENRY G. GENTRY
BY John H. Cassidy
ATTORNEY

Patented Jan. 6, 1953

2,624,705

UNITED STATES PATENT OFFICE 2,624,705

WATER PURIFIER

Henry G. Gentry, Dyersburg, Tenn.

Application July 3, 1950, Serial No. 171,899

2 Claims. (Cl. 210—16)

This invention pertains to apparatus for purifying water by filtration and aeration.

In accordance with this invention, generally stated, the water to be purified is passed first through an aerator of improved design, then to a detention tank in which it may be retained for an extended time to permit sedimentation. Means may be provided in the detention tank to pass the water through a suitable material for catalytic treatment to promote sedimentation. A pump is connected to draw water from the detention tank, which water is pumped into a pneumatic pressure chamber to provide a pressure for discharging the water for use. After passing through this pressure chamber the water is delivered to a filter in which it is filtered before being delivered for use. Suitable connections are provided between the pneumatic tank and the filter so that the flow of water through the filter may be reversed for cleaning the filter bed. Such counter-flow can then be made to take place under the pressure established by the pneumatic tank, which pressure may be maintained during such counter-flow by operation of the pump.

Figure 1:
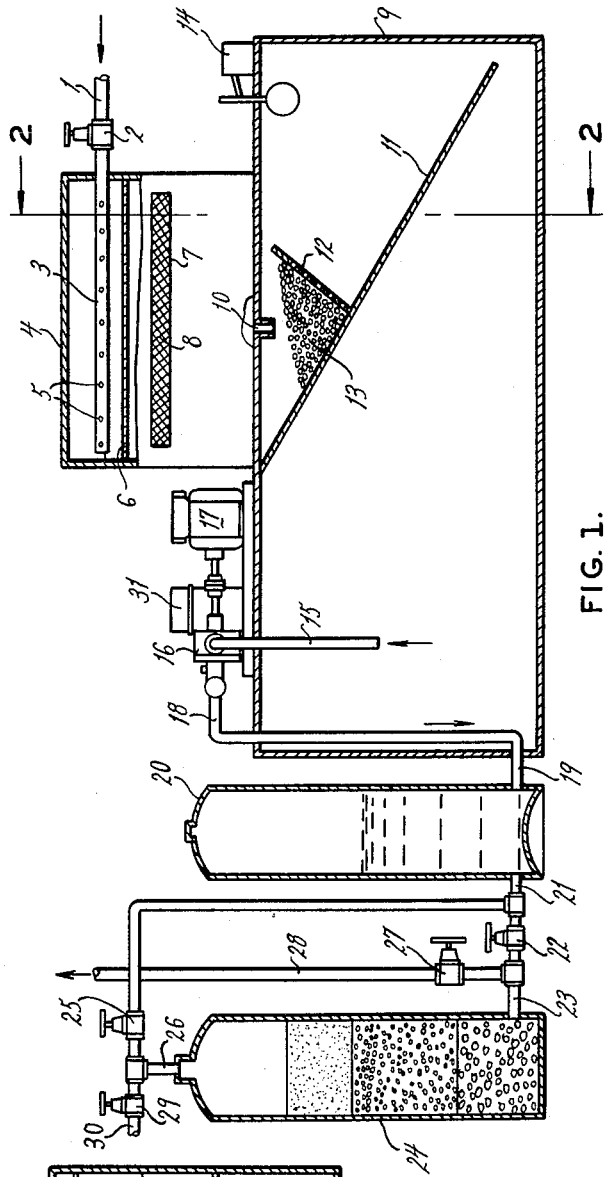
Figure 2:
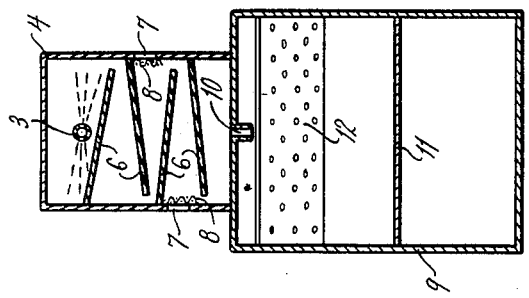

A preferred embodiment of this invention is illustrated in the accompanying drawing, in which Fig. 1 is a diagrammatic sectional view of a purifying apparatus embodying this invention; and Fig. 2 is a section on line 2—2 of Fig. 1.

Referring to the drawing, 1 designates a supply pipe which may come from a well, cistern, or other source of supply but driven by a suitable pump, not shown, if necessary. The supply pipe 1 may be connected through a suitable valve 2 to an inlet pipe 3 of an aerator 4. The aerator 4 comprises an enclosed chamber into the top of which the inlet pipe 3 passes. This pipe may extend clear across the chamber within the aerator and may be provided with perforations 5 to allow the issuing of water into jets so as break it up as much as possible to promote aeration. Within the aerator 4 a series of sloping baffles 6 is provided to receive the water which spreads out and flows in a thin sheet down along the baffle. Thus, these baffles provide sluiceways over which the water may flow. The lower end of each is spaced from the wall of the aerator 4 so as to permit the water to cascade from the end of one baffle to the succeeding one. Here again, the water is broken up into droplets whereby the surface exposed to the air is increased. The walls of the chamber 4 are perforated by windows 7 which are preferably placed just under the heads of certain of the baffles 6. These windows permit the entrance of air which may circulate through the chamber 4. They may be provided with screens 8 to prevent the entrance of insects or foreign matter.

Below the aerator 4 is a detention tank 9 arranged to receive the aerated water after passing through the chamber 4, which water enters the tank 9 by a passage 10 establishing communication between said tank and the aerator 4. Mounted in the tank 9 below the inlet 10 is a baffle 11 which slopes downward toward one end of the tank. On the upper side of the baffle 11 a perforated shelf or rack 12 is provided which, with the baffle 11 provides a receptacle in which comminuted material 13 may be placed. This provides for passing the aerated water through such material for catalytic action to promote sedimentation. The nature of such material would depend upon the properties of raw water received from the well. For instance, where such water contains iron in solution, limestone may be used as the material 13. When the water contains iron in suspension, charcoal may be used. These materials act catalytically to promote oxidation of the iron which is then in a better form to settle. The baffle 11 directs the flow of water which has been treated toward one end of the tank 9 so that it may flow gradually from one end to the other along the tank during its stay in the tank and during which period sedimentation may take place as the water flows gradually along the tank. A float switch 14 may be provided to control the pump delivering the water from the supply so as to maintain a constant level in the tank 9.

Connected with the tank 9, near the end thereof opposite to that toward which the baffle 11 directs the flow of water, is an outlet pipe 15 connected to a pump 16 of any suitable type driven by a motor 17. The discharge pipe 18 of the pump 16 is connected to the inlet 19 of a pneumatic pressure tank 20. The outlet 21 of the tank 20 is connected through a valve 22 to the outlet 23 of a filter 24. The outlet 21 is also connected through a valve 25 to the inlet 26 of the filter 24. The outlet 23 of the filter is also connected through a valve 27 with a service pipe 28 by which the water is delivered for use. Also connected to the filter inlet 26 through a valve 29 is a discharge outlet 30.

In the operation of this clarifier, the water received from the supply by the pipe 1 is passed into the aerator 4 in the form of a series of jets or spouts. It then flows down the successive baffles 6 cascading from one to the other until it reaches the bottom of the chamber 4 whereupon it passes through the connection 10 into the detention tank 9. This water is again subdivided in passing through a material 13 on the rack 12 after which it flows down the baffle 11 to the right-hand end of the tank 9, Fig. 1. As water is drawn off for use through the pipe 28, the pressure in the tank 20 is reduced, which reduction, operating through an automatic pressure switch 31, starts the pump 16 to draw water from the tank 9 and replenishes that drawn from the tank 20. This causes a gradual flow of water in the tank 9 from the right-hand end thereof toward the outlet pipe 15. As this tank is of considerable capacity, the water is detained therein for an extended time sufficient to permit impurities to settle to the bottom of the tank 9 as the water flows therealong. After leaving the tank 9, the water passes through a pressure tank 20 and then through the filter 24 where it is again filtered to remove any remaining traces of impurities. Under normal operation, the valves 27 and 25 are open while the valves 22 and 29 are closed. It will be seen that this causes the water from the tank 20 to pass through the valve 25 and into the filter 24 at its inlet 26. Thereafter, it passes downward through the filter to the outlet 23. As the valve 27 is open, the water may then pass out the pipe 28 to be delivered for use. When it is desired to wash the filter, the valves 25 and 27 are closed and the valves 29 and 22 are opened whereupon the water flows from the tank 20 into the tank 24 by way of the valve 22 and the outlet 23. This water passes upward through a filter bed, then out at 26. As the valve 25 is closed and the valve 29 is open, the wash water will pass out at the discharge connection 30. Thus, during the backwashing operation, the water flows under the pressure in the tank 20. However, as this pressure drops, the pump 16 will automatically start up and maintain the pressure so as to maintain the flow through the filter until it can be thoroughly cleansed. After such washing, by simply restoring the various valves to their former positions, the supply of filtered water for use may be resumed.

Various changes may be made in the details of construction, within the scope of the appended claims, without departing from the spirit of this invention. Parts of the invention may be used without the whole and improvements may be added while retaining some or all of the advantages of the invention.

I claim:

1. In a water clarifier of the character described, an elongated, horizontally extending sediment tank having a water inlet in the upper part thereof, a sloping baffle in said tank mounted with its upper portion positioned to receive the incoming water from said inlet and its lower end adjacent one end of said tank, a receptacle for water-treating material formed on the upper portion of said baffle having a foraminous wall adapted to permit flow of water from said receptacle downward along said baffle, and an outlet duct in the upper portion of said tank adjacent the other end thereof, whereby the flow through said tank is guided in a circuit in which the water entering at said inlet passes through said receptacle and the material therein, then flows downward along said baffle to one end of said tank, then along said tank to permit sedimentation, and finally is withdrawn from the other end of said tank at said outlet.

2. In a water clarifier of the character described, an elongated, horizontally extending sediment tank having a water inlet in the upper part thereof, a sloping baffle in said tank mounted with its upper portion positioned to receive the incoming water from said inlet and its lower end adjacent one end of said tank, a receptacle for water-treating material formed on the upper portion of said baffle having a foraminous wall adapted to permit flow of water from said receptacle downward along said baffle, an outlet duct in the upper portion of said tank adjacent the other end thereof, whereby the flow through said tank is guided in a circuit in which the water entering at said inlet passes through said receptacle and the material therein, then flows downward along said baffle to one end of said tank, then along said tank to permit sedimentation, and finally is withdrawn from the other end of said tank at said outlet, a pneumatic pressure tank, a pump connected to pump water from said sediment tank to said pressure tank, a filter, a connection from the outlet of said filter to deliver the filtered water for use, pipe connections from the outlet of said pressure tank to both inlet and outlet of said filter, and valves in said connections arranged for manipulation to reverse the flow through said filter under the pressure of said pressure tank and said pump.

HENRY G. GENTRY.

REFERENCES CITED

The following references are of record in the file of this patent:

UNITED STATES PATENTS

| Number | Name | Date |
|---|---|---|
| 1,006,992 | Wiener | Oct. 24, 1911 |
| 1,249,480 | Pflugfelder | Dec. 11, 1917 |
| 1,314,955 | Flicker | Sept. 2, 1919 |
| 1,984,219 | Krogh-Lund | Dec. 11, 1934 |
| 1,985,435 | Watson | Dec. 25, 1934 |
| 2,047,687 | Infield | July 14, 1936 |
| 2,048,158 | Goodwin | July 21, 1936 |
| 2,237,711 | Morgan | Apr. 8, 1941 |
| 2,271,165 | Watson | Jan. 27, 1942 |
| 2,366,945 | Walker | Jan. 9, 1945 |

FOREIGN PATENTS

| Number | Country | Date |
|---|---|---|
| 16,050 | Great Britain | 1913 |